Feb. 17, 1970  J. R. SCHEDER  3,496,081
MULTIPLE CELL ELECTRODIALYSIS USING POSITIVE AND NEGATIVE
IONS RECOMBINED
Filed May 22, 1967
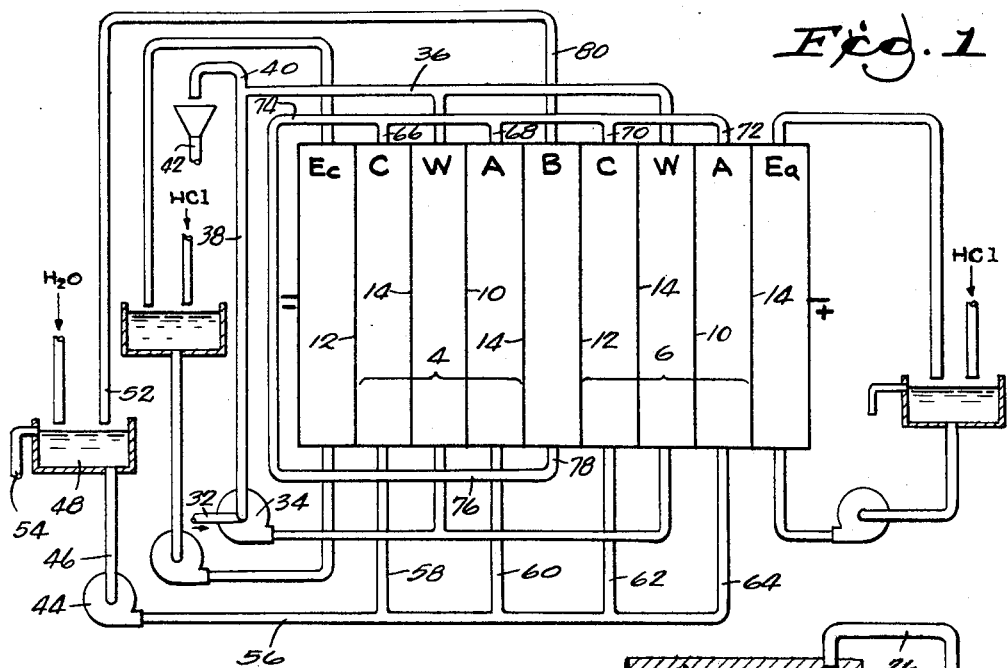
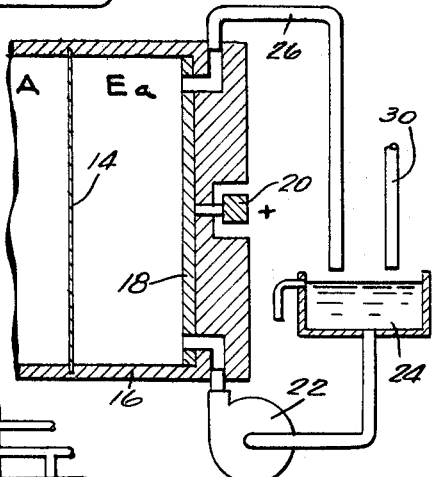
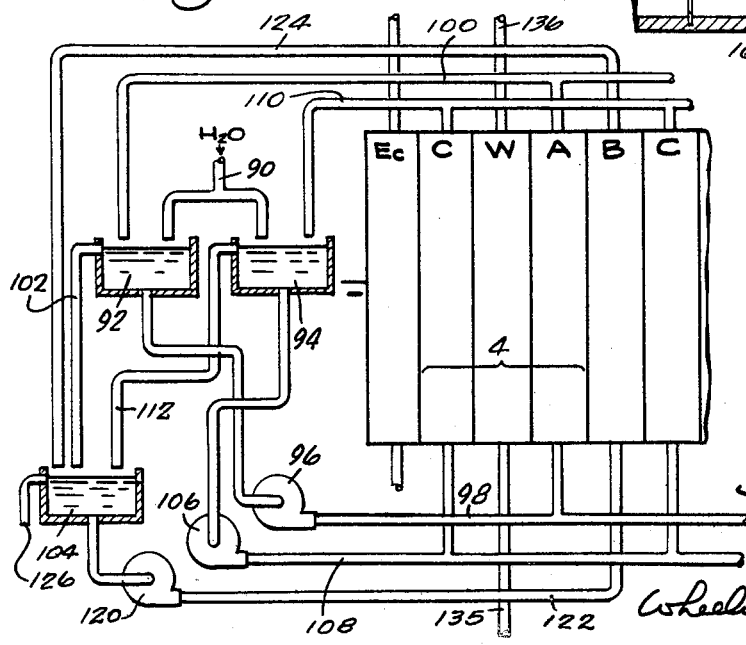
INVENTOR
JOHN R. SCHEDER
Wheeler, Wheeler, Howsen Clemency
ATTORNEYS United States Patent Office 3,496,081
Patented Feb. 17, 1970

3,496,081
MULTIPLE CELL ELECTRODIALYSIS USING POSITIVE AND NEGATIVE IONS RECOMBINED
John R. Scheder, Mayville, Wis., assignor to Purity Products Company, Mayville, Wis., a corporation of Wisconsin
Filed May 22, 1967, Ser. No. 640,291
Int. Cl. B01d *13/02*
U.S. Cl. 204—180                                   7 Claims

ABSTRACT OF THE DISCLOSURE

In multiple cell electrodialysis, positive and negative ions migrating toward catholyte and anolyte frames (under the influence of an electric field) are chemically combined with ions supplied from a barrier solution intervening between the cells of a stack. The resulting compounds, containing ions thus extracted from the material undergoing treatment are fed in combination to the barrier solution and used substantially to the exclusion of fresh makeup chemicals as ion sources for continuing the operation.

BACKGROUND OF INVENTION

The patents to Kollsman, 2,872,407, Feb. 3, 1959, and Dubey, 3,136,710, June 9, 1964, are typical of the closest art known to me. Dubey discloses multiple cell electrodialysis but, as is universal throughout this art, the barrier between the several cells comprises a solution of a fresh chemical. The fresh chemical added to the barrier is compatible with the material undergoing electrodialysis in the sense that it is capable of supplying ions for chemical union with those separated by electrodialysis from the material undergoing treatment.

In Patent 3,136,710, in which the purpose of electrodialysis is to desalinate various liquids such as sea water or spent sulfite liquor, the suggested makeup to be added to the barrier solution is an acid such as sulphuric acid, sulphurous acid, or acetic acid. The liquids discharged following electrodialysis, with or without recirculation, may comprise, first, the desalinated treated liquid and, secondly, concentrates of ions and anions removed from treated liquid and combined chemically with anions and cations drawn respectively from makeup acid in the barrier frame. The components thus withdrawn from the barrier liquid must be replaced, and this is conventionally done by continuous or periodic introduction of makeup chemicals into the barrier liquid. In the said patent, the makeup chemicals are acids.

The present invention is not at all concerned with the question whether there is recirculation through a treating frame, or whether the material removed by electrodialysis in the course of the treatment includes one or more than one fraction. These practices are now well known in the art.

SUMMARY OF INVENTION

The discovery upon which the present application is based is the fact that the segregated chemical compositions which include the cations and anions removed from the liquid under treatment, and which have been combined with elements supplied by the barrier solution, can advantageously be mixed together and fed into the barrier solution in lieu of fresh makeup, the result being to effect considerable economy in cost, and also to achieve superior ranges of separation.

In some operations, a very small amount of ammonium or sodium chloride is added to the barrier solution to minimize voltage requirements. Whether or not this is done is a matter of economics. Sometimes the added voltage costs less than even the small amount of salt contemplated to be added. There are times when the use in the barrier solution of the chemical compounds separated by electrodialysis makes it unnecessary to have any new chemical makeup. In no case is new salt required in more than nominal quantities. After the salts have been mixed together and passed through the barrier frame, the residues are discharged as would have been the case had they not been used in the barrier.

Feed water is added to the barrier at a rate high enough to keep the salt concentration moderate and back-dialysis minimal, but not so high that voltage requirements become excessive or polarization occurs in the barrier.

The invention applies to any and all desired amperage levels and any and all desalting levels. Despite some reverse dialysis and reduction in current efficiency at high levels of desalting, it is possible to achieve in excess of 99% desalination. However, this high degree of desalination is seldom required. For most purposes, fifty percent to ninety percent desalination is adequate. This is readily achieved by using current at 40 amps (for example, and not by way of limitation). At this amperage more salt is removed than dialysis can replace. The invention will be described particularly with reference to the desalination of whey, but it is not limited to this material. It is applicable to any electrodialysis operation. As applied to whey or to sea water (to use two examples only) the invention changes a salty product unsuitable for human consumption to a product entirely acceptable for human consumption.

Whey comprises serum proteins and lactose and salts in aqueous solution. After removal of casein and part of the lactose, the whey to be treated by electrodialysis contains salts such as sodium and potassium chloride and phosphates and citrates to a total of perhaps eight percent of the liquid weight and twenty percent of the solid weight. While substantially all salts are removable, the usual objective of electrodialysis of whey is to remove twenty-five percent to ninety percent of the salt content, the average salts removed amounting to fifty percent. Protein molecules are negatively charged and therefore the lower molecular weight molecules (which can pass the membrane) tend to migrate toward the anolyte concentrating frames A. Despite their presence in small percentage in the anolyte, it has been found practicable to combine the anolyte and catholyte for concurrent delivery to the barrier frame B where the respective ions and anions therein are used to continue the operation.

In preferred practice, a large number of cells are interposed in series between the anode and cathode. For example, there may be twenty-five cells each containing a whey treating frame, at least one anion concentrating frame, and at least one cation concentrating frame, the several such cells being respectively separated by barrier frames. The several "frames" are compartments partitioned from each other by one or another of the various known types of membranes through which ions and constituents of the treated liquid migrate respectively toward the anode and cathode of the assembly. The assembly is known as a stack. Within limits the cost of treatment is decreased as the number of treating cells between the anode and cathode is increased.

The said Patent 3,136,710 discusses the provision of secondary frames partitioned by selective membranes which function to pass molecules according to size. While the present invention contemplates employment of this practice, if desired, it will be understood that the use of this type of membrane is optional and forms no part of the present invention. In other words, the instant invention can be practiced whether or not either of the segregated solutions is subdivided into fractions.

BRIEF DESCRIPTION OF DRAWINGS

FIG. 1 is a schematic diagram of an electrodialysis stack which, by way of exemplification, shows only two cells and an intervening barrier frame.

FIG. 2 is a fragmentary detail view in section diagrammatically illustrating a preferred anode or cathode terminal structure.

FIG. 3 is a diagram similar to FIG. 1 showing a modified arrangement for the practice of the invention.

DESCRIPTION OF DISCLOSURE

It is again noted that the invention will be described with reference to the treatment of whey. However, I desire to make it clear that the invention is not limited to products which it is desired to make suitable for consumption by human beings or animals, since I contemplate that various other products may be treated in accordance with the invention.

Each of FIGS. 1 and 3 shows a stack which includes cells 4 and 6. Each of these cells basically comprises a frame W for the liquid to be treated, a frame C for concentration of cations, and a frame A for concentration of anions. Between the two cells is a frame B for the barrier solution. The partitions or membranes which define the frames may be selective or non-selective as desired and can be of the nature disclosed in Patent 3,136,710. As shown in FIG. 1, frame B is defined by membranes 14 and 12. Starting at the left in FIG. 1, the first frame C lies between membranes 12 and 14. The first frame W lies between membranes 14 and 10. The first frame A lies between membranes 10 and 14. The second frame C lies between membranes 12 and 14. The second frame W lies between membranes 14 and 10 and the second frame A lies between membranes 10 and 14. By way of illustration, and not by way of limitation, membranes 14 are cation selective, membranes 12 are anion selective and membranes 10 are non-selective in this particular example.

It will be noted that the so-called frames are chambers intervening between the respective extreme end membranes 12 and 14. Metal electrodes may, if desired, replace these. However, it is preferred to add frames $E_c$ for the catholyte and $E_a$ for the anolyte. These two frames are identical except for the electrode material used therein. The anolyte frame is diagrammatically illustrated in FIG. 2 by way of example. It comprises a box-like structure 16 having a membrane 14 as one wall and the electrode plate 18 as its opposite wall. This plate connects to the positive bus bar 20. In the case of the anolyte frame $E_a$ the plate connected to the positive bus bar is preferably made of or surfaced with platinum. In the case of the catholyte frame $E_c$ the plate is connected to a negative line and preferably made of stainless steel or the like.

Reference to FIG. 2 will show in simplified diagrammatic form an arrangement for supplying makeup anode solution to the anolyte frame $E_a$ by means of a pump 22 discharging into the bottom of the frame and having its inlet connected with a supply tank 24 to which the anolyte is returned through pipe 26 from the top of the frame. An overflow pipe 28 may be used to control level in tank 24. Ammonium hydroxide is supplied at a controlled rate through the supply pipe 30, which discharges into tank 24 to maintain pH at desired levels. An acid such as hydrochloric acid is usually incorporated in the makeup for frame $E_c$.

The apparatus diagrammed in FIG. 1 is known to the art as a "feed and bleed" system. It is immaterial to the invention whether the system is "feed and bleed" or single pass or batch. In the system of FIG. 1, the material to be treated is supplied through an inlet pipe 32 to pump 34 which delivers it to the respective frames W in as many cells as may be present in the stack. The treated liquid is discharged through the manifold 36 from the tops of the respective frames W. A part thereof is recirculated through pipe 38 which leads to the inlet of pump 34. To the extent that makeup material is supplied to pipe 32, some of the material is forced from the recirculatory system through the discharge pipe 40 and delivery pipe 42. Thus a large portion of the material treated is always being recirculated and a relatively small portion thereof is always being discharged.

Except for makeup water, the material circulated through the barrier frame B is all, or substantially all, derived from the anion concentrating frames A and the cation concentrating frames C. The paths of flow are as follows:

Pump 44 has its inlet connected by pipe 46 with tank 48 into which makeup water is supplied at a regulated rate through pipe 50. The makeup water supplied to pipe 50 need not be acidified since it equilibrates with the turbulent solution in tank 48. Effluent from the barrier frames B is returned to the same tank 48 through pipe 52. Aside from the makeup, all of the water in tank 48 has passed at least once through one or more of the frames A, C, or B.

From the bottom of tank 48, pump 44 is delivering the combined liquid through manifold 56 and pipes 58, 60, 62 and 64 to the various cation concentrating frames C and the various anion concentrating frames A. Connections 66, 68, 70 and 72 from the tops of these respective frames communicate with a manifold 74 which connects with lines 76, 78 leading to the barrier frame or frames B. As already explained, the outlet or outlets 80 from the barrier frame or frames lead through pipe 52 back to the tank 48. Most of the liquid is again recirculated. Some goes to the barrier frames and some of it is discharged as already described.

Thus the liquids initially traversing the several frames C and A, and including ions segregated by electrodialysis in the several frames C and A, are reunited not only to pass through the barrier frame or frames B but also to recirculate through frames C and A. In the barrier frames the combined liquids again supply anions and cations for chemical union with materials passing through frames W, after which recirculation is repeated as above described.

The resulting procedure is greatly simplified as compared with any other system known to me. It requires fewer controls and pumps, and less additive materials. Yet the efficiency in electrodialysis is extremely high and the effluent from the treating frames W can be desalinated to almost any desired extent, even approaching 100% complete desalination.

In the construction diagrammatically illustrated in FIG. 3, only one complete cell is illustrated at 4, it being understood that any additional number of cells will be included in the stack and separated by barrier frames such as that indicated at B.

The liquids in which anions and cations have been concentrated by the electrodialysis are combined, as before, to pass together through the barrier cell or cells B but the respective concentrates are recirculated through the respective cells A and C independently of each other. The circuit is as follows:

Makeup water supplied through pipe 90 is delivered into the tanks 92 and 94. As previously described, this water may be controlled as to pH if desired. From tank 92, water is delivered by pump 96 to the frames A via pipe 98. From the frames A, the water returns via pipe 100 to tank 92. To the extent that makeup water is reaching tank 92, there will be an overflow from tank 92 through pipe 102 to the tank 104.

From tank 94, pump 106 delivers water via pipe 108 to the frame or frames C. The effluent from frames C returns via pipe 110 to the tank 94. The overflow from that tank passes through the pipe 112 to tank 104 where it is commingled with the effluent from frames A.

The pump 120 is constantly delivering the combined liquids from tank 104 through pipe 122 to the barrier frame or frames B from which the effluent returns via pipe 124 to tank 104 for recirculation through the barrier frame or frames. The excess is discharged from tank 104 through overflow pipe 126.

In this embodiment, as in the embodiment of FIG. 1, the concentrates of anions and cations from frames A and C are reused in the barriers by combining them, regardless of what their further content may be in the way of proteins or otherwise. In the barrier frames their respective ions function as effectively or more effectively than as if derived from fresh chemicals.

In both embodiments the addition of makeup at a controllable rate, and the discharge from the tanks from which recirculation occurs, enables me to control the concentration as desired and effectively to desalinate the treated liquid supplied to frames W through pipe 135 so that the effluent through pipe 136 will be desalinated to any desired extent.

Two examples of desalination of whey are as follows:

(1) 19 g.p.h. whey was demineralized in a feed and bleed system using 25 whey treating frames and associated frames. The auxiliary stream conductivity was held at an average of 15,000 micromhos per centimeter by water feed of one gallon per minute. The total voltage was 60 volts at 40 amps. Desalting achieved was 33.6% corresponding to a change in salt content from 7.52% to 5.02%.

(2) 40 g.p.h. whey was demineralized in a feed and bleed system using four stacks of 25 whey treating frames each connected in series. The auxiliary stream conductivity averaged 9,000 micromhos per centimeter and the voltage per stack averaged 100 volts. Desalting achieved was 75% corresponding to a change in salt content from 7.5% to 1.9%.

I claim:

1. In a method of electrodialysis which includes passing liquids for treatment through a plurality of cells connected in a stack with an intervening barrier frame between cells, each cell comprising a cation concentrating frame, a treating frame, and an anion concentrating frame, the improvement which consists in commingling concentrates of anions and cations from a cell and passing such commingled concentrates collectively through the barrier frame.

2. A method according to claim 1 including independent recirculation through the respective concentrating frames of the respective effluents therefrom, only portions of such effluents previously recirculated separately being then commingled and passed through said barrier frame.

3. A method according to claim 1 in which the said concentrates are divided, portions thereof being recirculated through the respective cells and only a portion thereof being passed through the barrier frame, another portion thereof being discharged and replaced by makeup at a controlled rate.

4. A method according to claim 1 including the passing of liquids through said frames, the commingling of liquids which have passed through said frames, the recirculation of portions of the commingled liquids through both said frames, the liquid passed through the barrier frame constituting another portion of such commingled liquids.

5. A method of electrodialysis according to claim 1 in which the liquid treated comprises whey and the electrodialysis removes 25% to 90% of the original salt content of the whey.

6. A method of electrodialysis according to claim 1 in which the material treated comprises spent sulfite liquor.

7. A method according to claim 1 in which the liquid treated comprises water containing salt and the treatment desalinates such water by removal of more than 50% of its salt content.

References Cited

UNITED STATES PATENTS

| | | | |
|---|---|---|---|
| 2,794,776 | 6/1957 | Briggs | 204—151 |
| 2,802,344 | 8/1957 | Witherell | 62—119 |
| 3,395,087 | 7/1968 | McElhinney et al. | 204—180 |

JOHN H. MACK, Primary Examiner

A. C. PRESCOTT, Assistant Examiner

U.S. Cl. X.R.

204—301